United States Patent [19]

Macfie, Jr.

[11] Patent Number: 4,460,610

[45] Date of Patent: Jul. 17, 1984

[54] COATED FRUIT JUICE IMPREGNATED PLANTAINS

[75] Inventor: George B. Macfie, Jr., Oviedo, Fla.

[73] Assignee: A. Duda & Sons, Inc., Oviedo, Fla.

[21] Appl. No.: 381,765

[22] Filed: May 25, 1982

Related U.S. Application Data

[63] Continuation-in-part of Ser. No. 381,038, Mar. 23, 1982, Pat. No. 4,402,988.

[51] Int. Cl.³ .......................... A23L 1/212; A23L 3/34
[52] U.S. Cl. ..................................... 426/102; 426/103; 426/281; 426/615; 426/310; 426/335
[58] Field of Search ............... 426/102, 103, 302, 310, 426/281, 335, 615

[56] References Cited

U.S. PATENT DOCUMENTS

| | | | |
|---|---|---|---|
| 1,935,735 | 11/1933 | Chauvin | 426/302 |
| 2,353,333 | 9/1940 | Harris | 426/102 |
| 2,909,435 | 10/1959 | Watters et al. | 426/102 |
| 2,995,538 | 8/1961 | Toulmin | 426/102 |
| 3,025,169 | 3/1962 | Guadagni | 426/268 |
| 3,037,867 | 6/1962 | Daudin et al. | 426/310 |
| 3,398,001 | 8/1968 | Benson | 426/268 |
| 4,338,342 | 7/1982 | Tan et al. | 426/102 |

Primary Examiner—Robert A. Yoncoskie
Assistant Examiner—Marianne S. Minnick
Attorney, Agent, or Firm—Lalos, Leeds, Keegan, Lett, Marsh, Bentzen & Kaye

[57] ABSTRACT

A plantain impregnated with fruit juice, particularly orange juice, having a unique taste and texture. Plantains are selected with ripeness such that the sugar content is derived from at least 70% conversion of the starch to sugar, peeling the plantains and then apply a high vacuum to the plantains. The plantains are then immersed in a solution of fruit juice. After holding the vacuum for a time, the plantains are held immersed in the fruit juice under superatmospheric pressure for a sufficient dwell time to substantially completely impregnate the plantains which are then removed and frozen. The plantains prior to impregnation are desirably preserved from fungus attack by ripening the plantains in a low humidity of about a maximum of 40% relative humidity and/or contacting the plantains with a fungicide, such as that containing chlorine.

40 Claims, No Drawings

COATED FRUIT JUICE IMPREGNATED PLANTAINS

INTRODUCTION

This application is a continuation-in-part of copending U.S. patent application Ser. No. 381,038 filed Mar. 23, 1982 now U.S. Pat. No. 4,402,988.

BACKGROUND OF THE INVENTION

This invention relates generally to plantains and to the process for plantains to improve their taste and texture and enable them to be preserved as desired. More particularly the present invention is concerned with the process for treating plantains and the products produced thereby with a fruit juice that impregnates the plantain to produce a unique edible plantain product and preserving the impregnated plantain by freezing and coating the frozen plantain with an antioxidant mixture that stabilizes the plantain during fluctuations in storage temperature.

The plantain is a fruit belonging to the genus Musa and is related to the more widely known and more popular edible fruit, the banana. The plantain has generally been considered to be a staple in a diet of many people in South American and the Caribbean countries. In appearance the plantain is similar to the banana and its growth characteristics, harvesting and propagation are substantially identical to that of the banana. However, its taste and texture differ from the banana to such an extent that typically the plantain is looked upon as a vegetable in a sense that it is only consumed by cooking a green or unripe plantain rather than in a fresh ripe form as with the banana. Plantains are typically consumed only in an unripened cooked state rather than as a fresh ripe product because the flavor and texture of the plantain in its fresh ripe state is not acceptable to most people.

In spite of the recognized disadvantages, plantains have been an important food for many countries such as Puerto Rico where plantains may thrive in the mountains with the almost inaccessible terrain indigenous to Puerto Rico. The Puerto Rican economy would benefit significantly if there was an improvement in the food production, and if the plantain could be made to utilize fully the otherwise non-arable land, the plantain could be important to the revitalization of Puerto Rico and other countries in the Caribbean.

Before plantains could achieve the status of an important, if not vital, agricultural crop, the plantains would have to be available year round, but the plantain crop is typically harvested in the few months of late summer and early fall resulting in huge surpluses following harvest. Ideally, the plantains would be shipped as a food product to other geographic areas particularly the United States. To date, however, the United States' consumption of plantains is insignificant because the flavor and texture characteristics of the plantain have not been accepted by the typical North American.

To improve the taste and texture of the plantains, additives were thought to be useful to make the plantains more palatable, however, the plantain in its typical unripe state did not accept additives, such as fruit juice, due to the substantially impenetrable outer tissue of the plantain. The tissue of the plantain in cross section is similar to a honeycomb wherein the contents of each cell within the honeycomb is generally maintained by a liner that varies in its porosity. The process of ripening the plantain promotes the action of enzymes which in addition to converting starch to sugar also have been found to make the cell walls more permeable. More importantly, the middle lamella is partially dissolved accounting for some of the softening of the ripening fruit. Attempts to impregnate the plantain with the fruit juice when the plantain in unripe would not produce the desirable impregnation. Impregnation tests conducted on plantains attempted to be impregnated with fruit juice tended to verify the supposition that the impregnation is viable only when the cell contains a fairly high percentage of soluble material, as would be present when the plantain achieved a particular stage of ripeness. It appeared that in the unripe state, the cell wall membranes associated with the cell wall were impenetrable to dissolved solids contained in the fruit juice impregnate. While it is known that the ripening process involves an enzymatic change of starch to sugar the particular relationship between the stages of ripeness and impregnation were not recognized. When the plantain is ripe, it is yellow in color similar to the banana, also when the plantain is over ripe it is essentially black again much like the banana.

The impregnation of the plantains with orange juice has been described and claimed in detail in copending application Ser. No. 361,038 filed Mar. 23, 1982. In that application the plantains were impregnated with orange juice by means of a vacuum impregnation to produce the unique product that was then frozen and held at temperatures well below freezing to preserve the plantain.

It has been discovered that the product is significantly improved if a greater proportion of the plantain was impregnated with the fruit juice in order that the fruit juice flavor be a significant part of the taste treat when the product was consumed. Improvements in the impregnation technique were sought to enhance the impregnation of fruit juice in a greater proportion.

To preserve the plantain after impregnation it was found that the plantain product should be frozen to a temperature below 0° F. in order to maintain consistent quality of the plantain product. The temperature had to be kept extremely low consistently otherwise the impregnated plantain was found to be very susceptible to temperature fluctuation. This susceptibility was manifested by the development of a tan to brown color on this plantain and in extreme cases where the temperature fluctuation was great or time rather lengthy, the entire fruit would be discolored. While this discoloration due to the temperature fluctuation did not result in a flavor change, the discoloration of the fruit presented such an unappetizing appearance that it was unlikely that the product would have appealed to anyone. The more the variation in the temperature to which the plantains were subjected, the greater the discoloration and the more unacceptable it would be as a commercial product.

PRIOR ART

It is well known that various fruits have been impregnated by a vacuum process with various fluids. It is also known that the cells of various fruits contain gas pockets or vacuoles containing vapors that may be by-products of plant metabolism. In a vacuum process, the strong influence of the vacuum is presumed to permit the contents of these vacuoles to defuse through the cytoplasmic membranes and cellulose walls of the cells to create a physiological imbalance of cell contents that is then rectified by substitution of the liquid impregnate.

Birdseye U.S. Pat. No. 2,419,877 discloses the utilization of fruit juice as an impregnant for fruits under partial vacuum following dehydration of the fruit. By dehydrating the fruit initially, the vacuum process proceeds in a totally different fashion than if there was no dehydration.

Fehmerling U.S. Pat. No. 3,843,810 discloses a process for the air evacuation of foods under ultra-low pressure. Also disclosed is the impregnation of various fruits through a vacuum process that extracts the most minute amount of oxygen remaining in the fruit in order to avoid detrimental effects upon the preservation and storage characteristics of the fruit. This patented process evacuated the air from the fruit immersed in a liquid by applying a low pressure at a maximum rate in stages down to a pressure of 2 to 13 mm of Hg and holding the vacuum for a dwell time of at least one hour and thereafter releasing the pressure slowly in stages in order to effect the complete removal of the entrapped gases and impregnate the fruit without damage to the cell structure.

Other vacuum impregnation methods are disclosed in Weckel U.S. Pat. No. 2,865,758, Fisher U.S. Pat. No. 2,801,925 and Guadagni U.S. Pat. No. 2,702,248.

Regarding the coating of fruits the following prior art patents may be considered relevant.

Benson U.S. Pat. No. 3,398,001 discloses an antioxidant glazing of frozen avocados. The antioxidant coating may include lemon juice.

Guadagni U.S. Pat. No. 3,025,169 relates to the vacuum impregnation of various fruits with fruit juice that forms part of the protective solution. Lemon juice may be one of the preserving agents.

Hirtensteiner U.S. Pat. No. 3,361,578 discloses an antioxidant coating of lemon juice, citric acid, etc. on frozen avocados.

Oathout U.S. Pat. No. 2,860,994 describes a method for the preparation of a frozen food which is candied with a coating of dextrose, fructose and fruit acid solely for the sweetening effect. No mention is made of preservation and no binder is used to hold the coating in place.

OBJECTS OF THE PRESENT INVENTION

The principal object of the present invention is the production of a new and unique plantain product of acceptable flavor and texture.

It is also an object of the present invention to provide a process for impregnating plantains with fruit juice to impart a desirable flavor and texture to the impregnated plantain.

Another object of the present invention is the provision of a method for producing a plantain impregnated with fruit juice, such as orange juice, by drawing a vacuum and then subjecting the plantain to high pressure to improve the volume of fruit juice impregnated into the plantain.

This invention also has as an object the provision of a procedure for the impregnation of high concentrations of fruit juice into plantains that have been ripened to a preselected extent generally recognized as uselessly overripe and yet which have the capability of withstanding storage without degradation upon freezing provided a unique antioxidant mixture is coated on the plantain.

Another important object of the present invention is the provision of a frozen plantain product impregnated with orange juice and coated with an antioxidant coating that avoids the deleterious effects attributable to fluctuations in the sub-freezing temperatures.

A further object of the present invention is to produce a unique fruit juice impregnated plantain product protected from the fluctuations of storage temperatures by an antioxidant coating comprising an organic food acid, a monosaccharide and a food binder.

In its broadest aspects, the present invention has as an object the production of a unique plantain product impregnated with orange juice that is frozen and is stable at fluctuating sub-freezing temperatures to produce an edible product for sale and distribution in North America, South America, Central America and Caribbean countries so as to promote and develop the use of plantain as an important agricultural product.

These and other objects of the present invention will become apparent after careful study of the following specification and claims.

SUMMARY OF THE INVENTION

It was discovered that a plantain can be impregnated with fruit juice particularly orange juice to produce a unique product having both desirable taste and texture characteristics by selecting plantains having a ripeness such that the sugar content is derived from at least a 70% conversion of the starch to sugar, peeling the plantains and then applying at least a 29 inch vacuum to the plantains for at least 10 seconds. The plantains are then immersed in a solution of fruit juice for a time sufficient to initiate impregnation of the plantains with the fruit juice. When the vacuum is released the plantains are held immersed in the fruit juice for a dwell time of at least 10 seconds after which the pressure is increased to at least about 1.1 atmospheres when the impregnated fruit is removed for freezing at below 0° F. The frozen and impregnated plantain is then coated with an antioxidant mixture of an organic food acid, at least 5% by weight of a monosaccharide and a food binder of at least 5% by weight. The fruit prior to impregnation may be preserved from fungus attack by ripening the plantains in a low humidity of about a maximum of 40% relative humidity and/or contacting the plantains with a fungicide, such as that containing chlorine.

DESCRIPTION OF THE INVENTION

Great improvement in the consumption of plantains is believed to be possible if the plantains are impregnated with fruit juice, particularly orange juice and possess desirable storage characteristics. The impregnated plantain so produced is then capable of entering new geographical markets resulting in a valuable agricultural product that would have a positive effect upon the economy of a number of the Caribbean countries, particularly Puerto Rico.

To achieve this significant increase in the production and consumption of plantains, the impregnation with fruit juice, particularly orange juice, must result in substantially complete penetration in order to obtain the flavor and texture found more palatable to a wider range of peoples in North America. To achieve this substantially complete penetration of the fruit juice into the plantain was a problem that was not solvable from a knowledge of the prior art. Moreover, the product even when impregnated must be stored satisfactorily to permit transportation to areas of distribution. It is this storage requirement that could not be met with prior art processed and impregnated plantains because of a natural growth of fungus that would attack the impregnated plantain producing not only, an unappetizing taste, but also an unappealing appearance. Also even when frozen to below 0° F., if there were fluctuations in the subfreezing temperature, an undesirable discoloration on the surface of the plantains occurred due to enzymatic reactions resulting in an unappealing and unappetizing appearance.

It was thus discovered that plantain products to be successfully marketed to meet the production requirements must be not only impregnated with fruit juice in a specific manner but also must meet minimal storage requirements in order to inhibit the growth of fungus and the enzymatic reactions that would destroy the appetizing and appealing characteristics of the impregnated plantain.

It was further discovered that the process of the present invention can only successfully take place with plantains of a specified minimal overripeness compared to the recognized ripe stage showing a yellow color. Numerous experiments have proven that complete or nearly complete conversion of the starchy constituents of the fruit to sugar is essential. Such ripening produces cell contents of the plantain having a fairly high percentage of soluble material. The enzymatic change of starch to sugar inherently and naturally occurring in the ripening process causes the starch, as the principal cell carbohydrate present in the green state of the plantain, to be converted to sugar. It was discovered that, at this advanced stage of ripening, generally recognized as overripening, the cell contents of the outer membranes of the plantain change from insoluble, impenetrable barriers against impregnation to soluble cell contents, and more a penetrable membrane permitting the dissolved solids of the impregnant to enter the cells.

Successful impregnation of the plantains, it has been found, depends upon initially selecting ripe fruit wherein the sugar content is at least 70% converted from starch to sugar, and preferably, at least 85% to 90% by weight converted from starch or other carbohydrates to sugar. In this stage, the impregnant such as orange juice can be forced through the epidermal or abscission layer of a ripe plantain.

The ripeness of the fruit that meets this requirement, of at least 70% conversion of the starch to sugar, is typically recognizable by those skilled in the art as overripe. Thus, the specified overripeness of the fruit produces a soft, putty-like feel that is quite pronounced and easily determined by the experienced worker. The color of the fruit that is sufficiently ripe to meet the requirements of the present invention is dark exhibiting an essentially black external appearance. If necessary, experimental testing to determine the amount of residual starch may be made initially, or at any time with a penetrometer or other suitable means but as stated previously, those skilled in the art would be readily able to detect an essentially fully ripe plantain.

The ripening of the plantain may be achieved in any conventional manner either naturally or accelerated. Accelerated methods of ripening plantain utilizing ethylene gas are well known and have been described in patents such as McDonnell U.S. Pat. No. 3,620,765 and Burg, U.S. Pat. No. Re. 28,995. In either method of ripening, whether naturally or accelerated, it has been found that the texture of the overripe fruit attains the soft putty-like feel characteristic of the fully ripe fruit, and also, the essentially black external color of the epidermal layer, but it has been found that such overripening typically produces an undesirable fungal condition in which the plantains are covered with a reddish, greyish or blackish fungus that is not present in the merely ripe state. This fungus limits the usefulness of the plantains, but it has been discovered that this fungus can be controlled in either of two methods or a combination of both.

When the plantains are ripened with acceleration, the ethylene ripening gas is introduced into a ripening room containing the plantain preferably within 2 to 24 hours after harvesting. There the initiation of the ripening of the unripe fruit may begin at a temperature between 65° F. and 95° F. when held for a time between 10 and 72 hours while forcing a moving gaseous atmosphere containing 0.5 to 30,000 p.p.m. ethylene into continuous contact with the plantains. The ripening of the plantain may be achieved at a fruit temperature of about 66° F. to 85° F. in 3 to 5 days. Known prior art methods would include a 90 to 95% R.H. during such accelerated ripening to a ripe stage, but to achieve the overripeness of this invention the plantains develop a fungus.

In order to avoid the inherent fungus buildup it has been discovered that precautions to prevent the fungus from attacking the plantains can be achieved by performing the accelerated ripening at a very low humidity of a maximum 40% R.H. More preferably, the relative humidity should be in the range of 25% to 40% relative humidity to prevent the mold or fungus buildup.

Even with the low humidity accelerated ripening, the fungus may still grow subsequent to the ripening unless the plantains so ripened proceed immediately to the impregnation step. To avoid the possible buildup of this fungus or mold due to any unexpected delays in the impregnation, a fungicide dip is particularly desirable and should be used to treat the plantains within a few hours or up to a day after harvesting particularly if the plantains are to be ripened naturally which could take 5 to 10 days, preferably about 6 to 9 days, at temperatures about 65° F.

The fungicide may be made to contact the plantain either by dipping or spraying a composition that is conventional and contains any well-known fungicide such as a chlorine containing composition well known to those skilled in the art. A 100–200 p.p.m. composition of chlorine in an aqueous solution would be adequate to meet the requirements to prevent the growth of fungus on the plantains. The fungicide dip may be used alone when undertaken shortly after harvest if the plantains are being ripened naturally, or the fungicide may be applied prior to the accelerated ripening, even if the artificial ripening is achieved in the ethylene environment at low humidity as set forth above. In such instance, the fungicide treatment would tend to permit a delay in proceeding to the impregnation step after the plantains have been fully ripened by accelerated means.

At this stage of the process the plantains are almost black in color and the starch has been at least 70% converted to sugar so that the cell contents of the plantain are soluble and penetrable by the dissolved solids of the impregnant. The desirable impregnant for the purposes of the present invention is fruit juice, particularly orange juice.

The ripened plantain is impregnated with orange juice after the skin is peeled from the plantains. The peeled plantains are placed in an enclosed environment preferably in a perforated container above the volume of orange juice. The vacuum is drawn to at least 23 inches of Hg or greater. Preferably, the amount of vacuum would be about 3 to 4 mm of Hg. More preferably, the particular vacuum found desirable would be 5 to 6 mm of Hg. The time that the vacuum is to be applied before the plantain is to be immersed in the orange juice ranges from 10 seconds to one minute, but preferably, about 30 to 40 seconds during which time much of the entrapped gas within the cells has been removed. Thereafter, the plantain is immersed in the orange juice by lowering the perforated bucket containing the plantain, and after immersion, the vacuum is broken.

At this stage, the plantains have been impregnated with the fruit juice, but not as completely as desired to avoid the typically undesirable and unpalatable plantain taste in portions of the plantain interior. It has been found that pressurizing the plantains while submerged in the orange juice produces significantly improved penetration of the orange juice into the innermost tissues of the plantain. The pressure found to be required is at least 1.1 atmospheres and preferably 2 to 5 atmospheres and should be applied for at least 30 seconds and up to 5 minutes and over. A 3.0 atmosphere for about 1.5 minutes has been found to be effective. When the pressure is released, the plantains may, if desired, remain immersed in the orange juice for an additional time that is preferably at least 10 seconds, but more preferably, at least one minute to 5 minutes. After this procedure the fruit juice is completely impregnated within the plantain.

Upon removal from the orange juice, the substantially completely impregnated plantain is then frozen. The freezing temperature is not critical although preferably it is in the range of 0° F. to minus 20° F. to lower temperatures. To avoid the enzymatic reactions to which the impregnated plantains are susceptible, it has been found that an antioxidant coating is important to be formed on the plantains.

The coating found to be particularly desirable for the frozen impregnated plantain is one that not only has antioxidant characteristics but also substantially excludes air from contacting the body of the impregnated plantain. It has been found that a thick coating placed on the plantain can have the effectiveness of an antioxidant coating as well as being capable of excluding air in order that the enzymatic reactions that typically would cause the discoloration of the plantain under fluctuating sub-freezing temperatures do not take place.

The coating found to be particularly desirable is a mixture of an organic food acid which acts principally as an antioxidant, a monosaccharide that may provide some gelling and also have a beneficial effect upon the taste of the impregnated plantain, and also as part of the mixture it has been found that a food binder or gelling agent should be added in order to retain the mixture in the form of a coating.

The organic food acid that has been found to be particularly useful includes those such as tartaric, maleic, acetic or citric as well as others well known to those in the art as organic food acids. The amount of the food acid in aqueous solutions should be such as to produce a Brix of anywhere within the wide range of 10° Brix to 40° Brix though preferably 18° to 28° and more preferably 20°–24° Brix. As a particularly useful organic food acid orange juice has been found to be effective and may be for instance at a concentration of 22° Brix. The monosaccharides present are those simple sugars having 5–6 carbon atom pentoses or hexoses including sorbose, galactose, mannose, dextrose and glucose. Of particular usefulness is fructose. The amount of the monosaccharide that be present in the mixture is 2–20% by weight and preferably 5–10% by weight but about 5% most preferred. The binding agent can be any food grade starch or vegetable gelling agent that may include starches such as tapioca or corn or wheat starch or as a vegetable gelling agent, gelatin has been found to be particularly useful. In fact, any food grade starch or vegetable gelling agent that hydrates at a temperature below 180° F. would be useful. Tapioca starch is of particular usefulness when present in the range of 2–20% by weight and preferably 5–10% by weight with about 5% particularly desirable.

The mixture is then preferably heated with agitation within the range of 155°–180° F. If the starch had been pre-gelatinized temperatures of about 155° are adequate and, if not gelatinized, the temperature range of 180° F. or greater is desired. In general, when utilizing tapioca starch the heating with agitation should be in the range of 160°–175° F. and generally about 160° F. to 165° F.

At this stage the mixture is almost ready for coating on the frozen plantain but it must be cooled prior to coating in order to control the thickness of the coating which is preferably from 1/16 to ¼ inch thick, preferably approximately ⅛ inch thick. To regulate the thickness of the coating, the temperature of the coating is controlled within a broad range of 95° F. to 125° F. and preferably 110°–115° F. Generally, the higher temperatures result in thinner coats than the ⅛ inch desirable thickness, while lower temperatures of the mixture produce coatings in the ¼ inch and greater range.

It has been found difficult to control the temperature of the coating mixture, yet it is desirable to maintain the temperature within the range when applied to the frozen plantain. When the coating is applied by any conventional means, the coating will thicken sufficiently on the frozen plantain surface to keep it from sliding. The plantain as it receives the coating may be rotated on a horizontal axis to assure that the coating is relatively uniform, and that the coating will harden on the frozen plantain surface.

In the simplest method for coating the plantains, the frozen plantains are dipped into a container of the heated mixture and are retrieved to be rotated on a horizontal axis while retaining the thickness of the coating within the specified limits.

The frozen ripe plantain impregnated with orange juice is found to have a texture that is pleasing to the palate and a taste that is very acceptable when compared to the bland, tasteless plantain previously marketed. The coating on the plantain preserves the desirable color that is typically recognizable as a plantain even during fluctuations in the sub-freezing storage.

The invention as above described is believed to meet the objects set forth and should only be limited in scope by the following claims in which

I claim:

1. The process of impregnating plantains with fruit juice comprising:
 selecting plantains having a sugar content derived from at least a 70% conversion of starch to sugar,
 peeling said plantains,
 applying at least a 23 inch vacuum to said plantains for at least 10 seconds,
 immersing said plantains in a solution of fruit juice for a time sufficient to initiate impregnation of said plantains with said fruit juice, releasing said vacuum and thereafter holding said plantains immersed within said solution for a dwell time of at least 10 seconds, increasing the pressure on said plantains to at least 1.1 atmospheres, removing said fruit juice impregnated plantain from said immersion, and freezing the juice impregnated plantain.

2. The process of claim 1 including, said plantain having at least 85% conversion of starch to sugar.

3. The process of claim 1 including, said plantain being essentially black in external coloring and of soft texture.

4. The process of claim 1 including, artificially ripening said plantain in a low humidity of about a maximum of 40% R.H.

5. The process of claim 1 including, controlling fungus growth on said plantains before applying said vacuum by contacting said plantains with a fungicide.

6. The process of claim 5 including, applying said fungicide within 2 to 24 hours of the time of harvest.

7. The process of claim 1 including, the dwell time being between 10 seconds and one minute.

8. The process of claim 1 including, said dwell time being between 30 to 40 seconds.

9. The process of claim 1 including, said plantain having at least 85% conversion of starch to sugar,
said plantain being essentially black in external coloring and of soft texture, and
artificially ripening said plantain in a low humidity of about a maximum of 40% R.H.

10. The process of claim 9 including, said plantain having at least 85% conversion of starch to sugar,
said plantain being essentially black in external coloring and of soft texture,
controlling fungus growth on said plantains before applying said vacuum by contacting said plantains with a fungicide, and
applying said fungicide within 2 to 24 hours of the time of harvest.

11. The process of claim 1 including, said plantain having at least 85% conversion of starch to sugar,
said plantain being essentially black in external coloring and of soft texture,
artificially ripening said plantain in a low humidity of about a maximum of 40% R.H., and
the dwell time being between 10 seconds and one minute.

12. The process of claim 1 including, said plantain having at least 85% conversion of starch to sugar,
said plantain being essentially black in external coloring and of soft texture,
artificially ripening said plantain in a low humidity of about a maximum of 40% R.H., and
said dwell time being between 30 to 40 seconds.

13. The process of claim 11 or 12 including, said fruit juice being orange juice.

14. The process of claim 1, 11 or 12 including increasing said pressure on said plantains to greater than 2 atmospheres and up to about 5 atmospheres and said fruit juice being orange juice.

15. The product of the process of claim 1.

16. The product of the process of claim 14.

17. A frozen fruit juice impregnated plantain having desirable storage characteristics comprising:
said plantain having a peeled body,
a sugar content derived from at least a 70% conversion of starch to sugar,
said body being impregnated with fruit juice and frozen,
a coating formed on said body to preserve the impregnated plantain from degradation from temperature variations,
said coating formed from a combination containing an aqueous solution of an organic food acid, at least 2% by weight of a monosaccharide, and a food binder of at least 2% weight.

18. The product of claim 17 including,
selecting said food acid from the group consisting of tartaric, maleic, acetic and citric or combination thereof.

19. The process of claim 17 including,
selecting said monosaccharide from the group consisting of the pentoses and hexoses.

20. The product of claim 17 including,
selecting said monosaccharide from the group consisting of fructose, sorbose, galactose, mannose, dextrose and glucose.

21. The product of claim 17 including,
said monosaccharide being fructose.

22. The product of claim 17 including,
said food binder being a starch or gelatin.

23. The product of claim 17 including,
said food binder being tapioca starch.

24. The product of claim 17 including,
said organic food acid being orange juice at approximately 10° to 40° Brix.

25. The product of claim 17 including,
selecting said food acid from the group consisting of tartaric, maleic, acetic and citric or combination thereof, and
said monosaccharide selected from the group consisting of the pentoses or hexoses.

26. The product of claim 17, 20, 21, 23 or 24 including,
selecting said food acid from the group consisting of tartaric, maleic, acetic and citric or combination thereof,
said monosaccharide selected from the group consisting of the pentoses or hexoses, and
said food binder being a starch or gelatin.

27. The process of producing a frozen fruit juice impregnated plantain having long storage characteristics comprising,
selecting plantains having a high sugar content,
peeling said plantains,
impregnating said plantains with fruit juice,
freezing said plaintains,
forming a coating on said plantains from a mixture comprising,
a solution of an organic food acid with at least 2% by weight of a monosaccharide and at least 2% by weight of a food binder, whereby the plantain possesses long storage characteristics under varying temperature conditions.

28. The process of claim 27 including,
prior to forming said coating,
heating said mixture to at least 155° F. and then,
cooling said mixture to below 125° F.

29. The process of claim 28 including,
said heating being in the approximate range of 155° to 180° F., and
said cooling being in the range of approximately 95° to 125° F.

30. The process of claim 27, 28, or 29 including,
said coating being approximately ⅛" thick.

31. The process of claim 30 including,
increasing or decreasing the coating thickness by raising or lowering respectively, the temperature of the coating mixture prior to coating.
32. The process of claim 27 including,
selecting said food acid from the group consisting of tartaric, maleic, acetic and citric or combination thereof.
33. The process of claim 27 including,
said monosaccharide being one of the pentoses or hexoses.
34. The process of claim 27 including,
said monosaccharide being one of fructose, sorbose, galactose, mannose, dextrose and glucose.
35. The process of claim 27 including,
said monosaccharide being fructose.
36. The process of claim 27 including,
said food binder being a starch or gelatin.
37. The process of claim 27 including,
said food binder being tapioca starch.
38. The process of claim 27 including,
said organic food acid being orange juice at approximately 22° Brix.
39. The process of claim 27 including,
selecting said food acid from the group consisting of tartaric, maleic, acetic and citric or combination thereof, and
said monosaccharide selected from the group consisting of the pentoses or hexoses.
40. The process of claim 27, 34, 35, or 37 including,
selecting said food acid from the group consisting of tartaric, maleic, acetic and citric or combination thereof,
said monosaccharide selected from the group consisting of the pentoses or hexoses, and
said food binder being a starch or gelatin.

* * * * *